No. 663,115. Patented Dec. 4, 1900.
J. J. BERRIGAN.
CENTRIFUGAL LIQUID SEPARATOR.
(Application filed Dec. 19, 1899. Renewed Aug. 29, 1900.)
(No Model.)
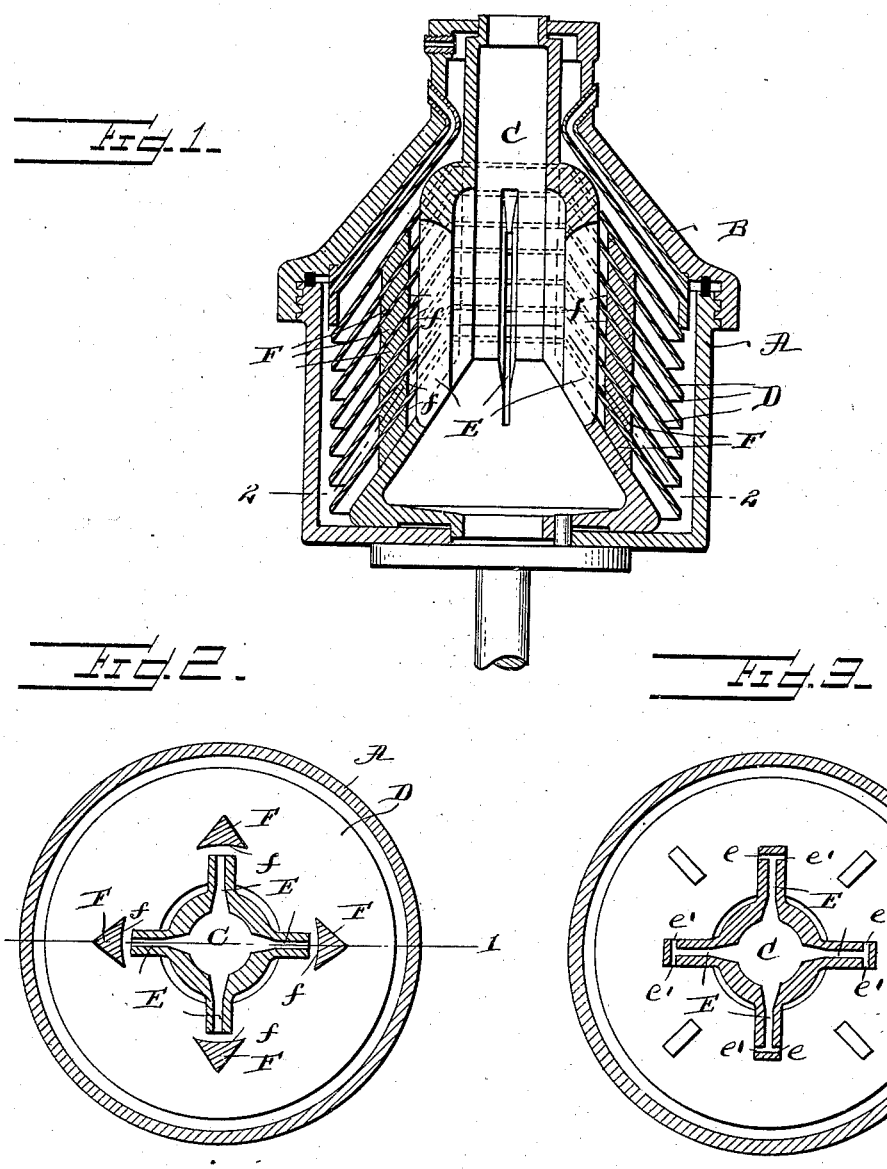
Witnesses.
Inventor.

UNITED STATES PATENT OFFICE.

JOHN JOSEPH BERRIGAN, OF AVON, NEW YORK, ASSIGNOR TO THE DE LAVAL SEPARATOR COMPANY, OF NEW JERSEY.

CENTRIFUGAL LIQUID-SEPARATOR.

SPECIFICATION forming part of Letters Patent No. 663,115, dated December 4, 1900.

Application filed December 19, 1899. Renewed August 29, 1900. Serial No. 28,427. (No model.)

*To all whom it may concern:*

Be it known that I, JOHN JOSEPH BERRIGAN, a citizen of the United States, residing at Avon, county of Livingston, and State of New York, have invented a new and useful Improvement in Centrifugal Liquid-Separators, of which the following is a full, clear, and exact description, reference being had to the accompanying drawings, which form a part of this specification.

My invention relates to certain improvements in that class of centrifugal liquid-separators which are particularly adapted for the separation of cream from milk and which are provided with a series of superposed conical disks between which the separation takes place. My invention specifically relates to the improvement in the feed device for this class of separators wherein the milk is injected between the outer and inner edges of adjacent disks. In that class of machines the new milk is fed between the disks at a number of radial points around the surface of the disks. As a consequence at the exact point of entry of the milk the disks receive a larger quantity and do more work than the space between the inlet-points. As a consequence the milk is unevenly distributed over the disks, and therefore the full capacity of the bowl is not obtained.

Generally speaking, my invention consists in providing means to distribute the milk, which is projected between adjacent disks from a plurality of outlets, so that the milk shall be distributed substantially evenly over the entire surface of the disks. The construction by which I accomplish this result, speaking generally, consists in providing the disks at the inlet-points with a distributer or so constructing the inlet that it is itself a distributer, so that instead of the milk being projected radially from each inlet it is discharged at an angle to the radius. To put it another way, heretofore the inlet in this class of machines has been substantially radial, while in my invention I discharge the same at an angle to the radius, so as to project it around the disks and toward adjacent inlets.

I will now describe the embodiment of my invention as shown in the drawings.

Figure 1 is a section on the line 1 1 of Fig. 2. Fig. 2 is a section on the line 2 2 of Fig. 1. Fig. 3 is a view similar to Fig. 2 of a modified form.

A is the bowl. B is the cover; C, the feed-tube; D, a plurality of superposed disks, and E open-ended wings which project from the feed-tube C to a point between the outer and inner edges of the disks. So far this construction is substantially that which was in existence prior to the invention forming the subject-matter of this application.

In order to provide means to deliver the full milk upon the disks between the adjacent wings E, I provide the following means: In the drawings I have shown two means. One of these is shown in Figs. 1 and 2, which consists in the following: Contiguous to the mouth of the open end of the wings E is a triangular metallic projection F, which is secured to the disk. The outgoing milk from the wings strikes the edge *f* of this distributer F and is deflected from its radial direction and caused to move in two directions, each of which is toward an adjacent wing. This is equally true, of course, of all of the discharge openings or wings. By this construction the incoming full milk is distributed around the entire surface of the disks. These projections F may, if desired, be used as spacing-pieces between the adjacent disks in addition to their purpose hereinbefore described. In Fig. 3 I have shown another arrangement. In this arrangement the sides of the wing E near the ends are provided with openings *e* and *e'*. This causes the full milk to be discharged at an angle to the radius. It is evident that in place of two openings *e* and *e'* one only may be used.

While I have shown specific constructions as embodiments of my invention, I do not intend to be limited to any particular form of feed-tube or any particular method by which the milk is discharged between adjacent disks, as this may be varied in many ways.

The object and purpose of my invention consists in distributing the incoming milk from a plurality of inlets in such a way that its direction shall be around the disks and toward adjacent inlets instead of being toward the periphery of the bowl.

Having now fully described my invention, what I claim, and desire to protect by Letters Patent, is—

1. In a centrifugal liquid-separator, the combination with a division contrivance consisting of plates extending from near the periphery of the bowl toward the axis thereof, and intersecting both radial horizontal and radial vertical lines of the bowl, of a plurality of inlet devices opening between adjacent plates of the division contrivance between the outer and inner extremities of the division contrivance, means to direct the discharge from said inlet devices at an angle with the radius of the bowl.

2. In a centrifugal liquid-separator, the combination with a division contrivance, consisting of plates extending from near the periphery of the bowl toward the axis thereof, and intersecting both radial horizontal and radial vertical lines of the bowl of a plurality of inlet devices, opening between adjacent plates of the division contrivance between the outer and inner extremities of the division contrivance, deflectors secured to said plates in alinement with said inlet devices, said deflectors being adapted to direct the movement of the incoming liquid in a path at an angle with the radius of the bowl.

In testimony of which invention I have hereunto set my hand, at Philadelphia, Pennsylvania, on this 15th day of December, 1899.

JOHN JOSEPH BERRIGAN.

Witnesses:
M. F. ELLIS,
J. M. SHINDLER, Jr.